US010754167B2

(12) United States Patent
Chi et al.

(10) Patent No.: US 10,754,167 B2
(45) Date of Patent: *Aug. 25, 2020

(54) STRUCTURED-LIGHT PROJECTOR (71) Applicant: HIMAX TECHNOLOGIES LIMITED, Tainan (TW)

(72) Inventors: Cheng-Hung Chi, Tainan (TW); Ming-Shu Hsiao, Tainan (TW)

(73) Assignee: Himax Technologies Limited, Tainan (TW)

( * ) Notice: Subject to any disclaimer, the term of this patent is extended or adjusted under 35 U.S.C. 154(b) by 213 days.

This patent is subject to a terminal disclaimer.

(21) Appl. No.: 16/035,337

(22) Filed: Jul. 13, 2018

(65) Prior Publication Data

US 2019/0086681 A1    Mar. 21, 2019

Related U.S. Application Data

(63) Continuation-in-part of application No. 15/706,060, filed on Sep. 15, 2017, now Pat. No. 10,386,706.

(51) Int. Cl.
*G02B 27/42* (2006.01)
*G02B 27/30* (2006.01)
*G01B 11/25* (2006.01)

(52) U.S. Cl.
CPC ............ *G02B 27/425* (2013.01); *G01B 11/25* (2013.01); *G02B 27/30* (2013.01)

(58) Field of Classification Search
CPC .. G02B 27/425; G02B 27/30; G03B 21/2033; G03B 21/206; G03B 21/208; G06T 7/521; G01N 21/4788; G01B 11/22
See application file for complete search history.

(56) References Cited

U.S. PATENT DOCUMENTS

| | | | |
|---|---|---|---|
| 8,749,796 B2 | 6/2014 | Pesach et al. | |
| 10,386,706 B2* | 8/2019 | Hsiao | G03B 21/147 |
| 2012/0038986 A1* | 2/2012 | Pesach | G01S 17/74 |
| | | | 359/572 |
| 2013/0038881 A1* | 2/2013 | Pesach | G01B 11/25 |
| | | | 356/610 |
| 2015/0338676 A1* | 11/2015 | Cayer | G02B 27/46 |
| | | | 356/610 |
| 2015/0355470 A1* | 12/2015 | Herschbach | G03B 15/06 |
| | | | 362/11 |
| 2017/0199310 A1* | 7/2017 | Okano | G02B 5/1861 |
| 2017/0322424 A1* | 11/2017 | Rossi | G02B 27/44 |

* cited by examiner

*Primary Examiner* — Kimberly N. Kakalec
(74) *Attorney, Agent, or Firm* — Donald E. Stout; Stout, Uxa & Buyan, LLP (57) ABSTRACT

A structured-light projector includes a light source that emits an emitted light with a predetermined pattern; and a diffractive optical element (DOE) that directly receives the emitted light and generates a plurality of light tiles, which are randomly or regularly disposed.

20 Claims, 13 Drawing Sheets

STRUCTURED-LIGHT PROJECTOR

CROSS-REFERENCE TO RELATED APPLICATIONS

This application is a continuation-in-part of U.S. application Ser. No. 15/706,060, filed on Sep. 15, 2017 and entitled STRUCTURED-LIGHT PROJECTOR, the entire contents of which are herein expressly incorporated by reference.

BACKGROUND OF THE INVENTION

1. Field of the Invention

The present invention generally relates to a projector, and more particularly to a structured-light projector.

2. Description of Related Art

Compact or micro-miniature optical projectors are used in a variety of applications, such as casting a pattern of structured light onto an object for the purposes of three-dimensional (3D) or depth mapping. In the 3D mapping system, an image capturing device such as a camera is adopted to capture an image of the pattern that is projected onto the object. The captured image is then processed to reconstruct a 3D map of the object.

Conventional projectors commonly suffer from poor performance due to low decode rate. Moreover, although optical systems have been made more compact with reduced cost owing to advances in optics manufacturing, conventional projectors still have room for improvement in respect of volume and/or cost.

For the reasons that conventional projectors either are poor in performance or are bulky or expensive, a need has arisen to propose a novel structured-light projector with improved performance and/or reduced volume or cost.

SUMMARY OF THE INVENTION

In view of the foregoing, it is an object of the embodiment of the present invention to provide a structured-light projector with enhanced performance and/or reduced volume or cost.

According to one embodiment, a structured-light projector includes a light source, a beam limiting device and a diffractive optical element (DOE). The light source emits an emitted light with a predetermined pattern. The beam limiting device receives the emitted light and generates a collimated light. The DOE receives the collimated light and generates a plurality of light tiles, which are randomly disposed.

According to another embodiment, a structured-light projector includes a point light source, a beam limiting device, a patterning device and a diffractive optical element (DOE). The point light source emits an emitted light. The beam limiting device receives the emitted light and generates a collimated light. The patterning device receives the collimated light and generates a patterned light. The DOE receives the patterned light and generates a plurality of light tiles, which are randomly disposed. In a further embodiment, the DOE precedes the patterning device.

According to a further embodiment, a structured-light projector includes a light source and a diffractive optical element (DOE). The light source emits an emitted light with a predetermined pattern. The DOE directly receives the emitted light and generates a plurality of light tiles, which are randomly or regularly disposed.

DETAILED DESCRIPTION OF THE INVENTION

Figure 1A:
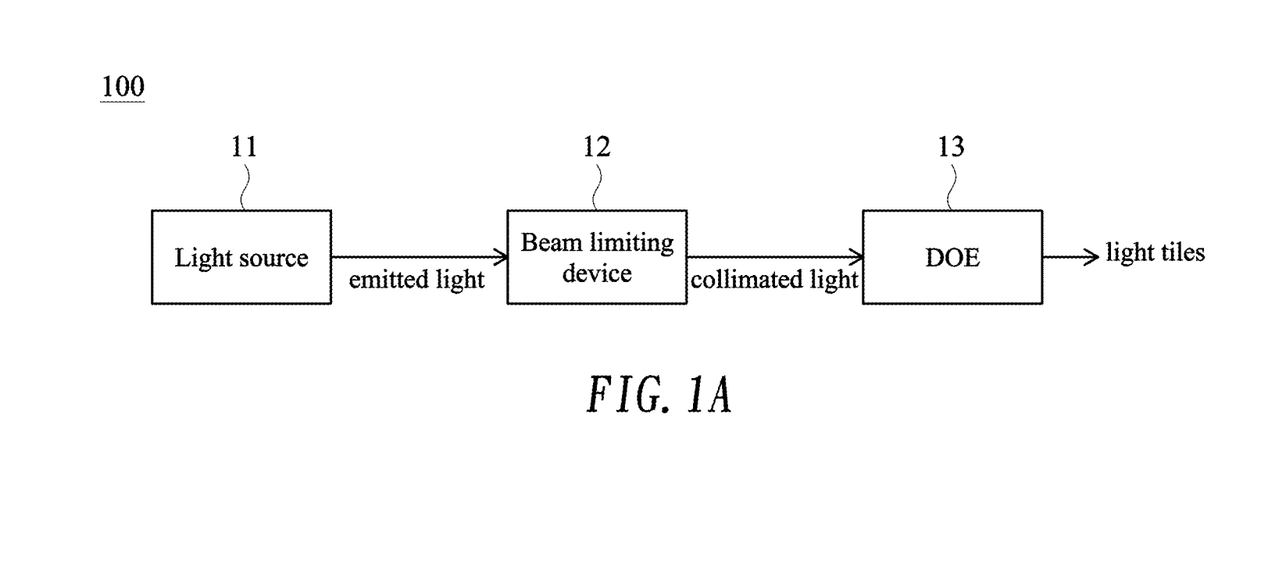
FIG. 1A shows a block diagram illustrated of a structured-light projector according to a first embodiment of the present invention.
Figure 1B:
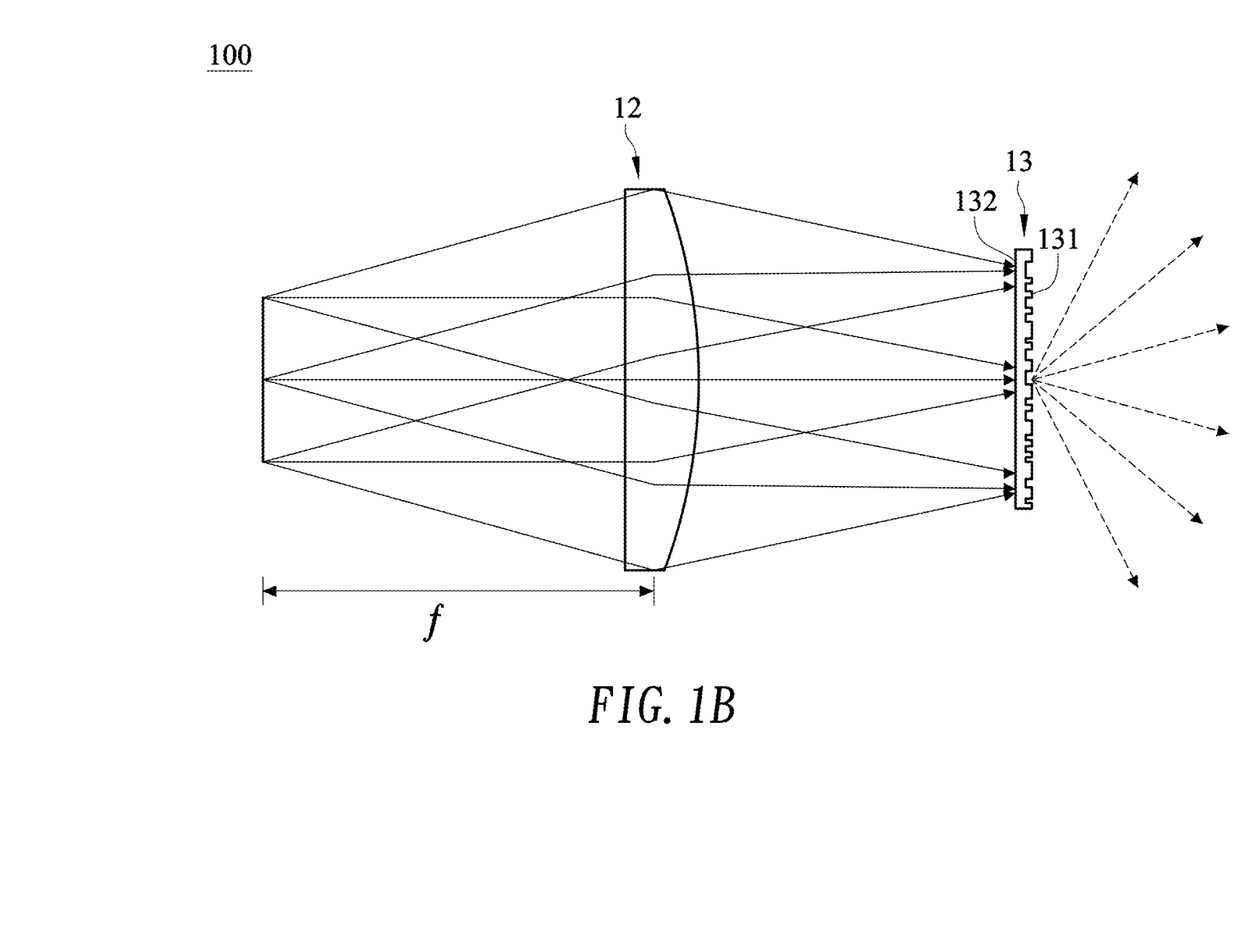
FIG. 1B shows a schematic diagram exemplifying the structured-light projector of FIG. 1A.

FIG. 1A shows a block diagram illustrated of a structured-light projector 100 according to a first embodiment of the present invention, and FIG. 1B shows a schematic diagram exemplifying the structured-light projector 100 of FIG. 1A. The structured-light projector 100 is preferably a compact optical projector adaptable to casting a pattern of structured light, for example, onto an object for three-dimensional (3D) mapping.

In the embodiment, the structured-light projector 100 may include a light source 11 that emits an emitted light with a predetermined pattern. The emitted light may be visible light and/or invisible light such as infrared light. The light source 11 of the embodiment may include an array of semiconductor diodes arranged according to the predetermined pattern. In a preferred embodiment, the light source 11 may include an array of vertical-cavity surface-emitting laser (VCSEL) diodes, which are disposed on a substrate (not shown) and are arranged on the substrate according to the predetermined pattern. Accordingly, the VCSEL diodes, as the light source 11, perform light emission and patterning at the same time. The VCSEL diodes can be used advantageously in producing a compact and high-density light source.

Figure 2A:
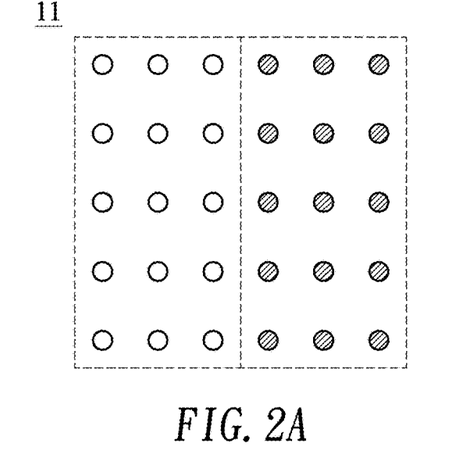
FIG. 2A shows partial semiconductor diodes of the light source that are grouped into two groups side by side and turn on in sequence.
Figure 2B:
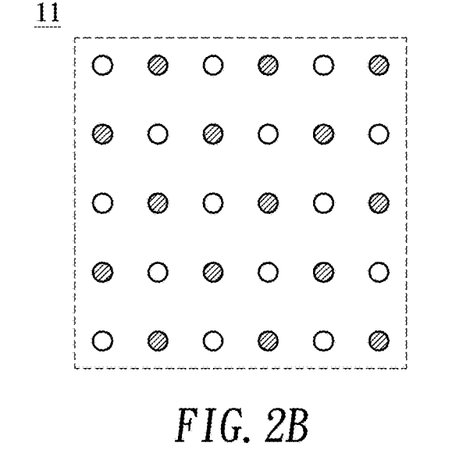
FIG. 2B shows some other semiconductor diodes of the light source grouped into two groups that are interleaved and turn on in sequence.
Figure 2C:
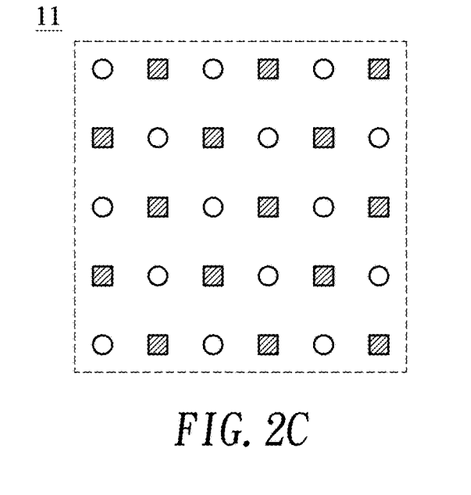
FIG. 2C shows semiconductor diodes of the light source that are grouped into two interleaved groups by shape and turn on in sequence.

In one embodiment, the semiconductor diodes of the light source 11 may turn on in sequence, for example, in order to reduce power consumption, enhance decode rate and/or achieve better performance at near region. FIG. 2A shows partial semiconductor diodes of the light source 11 that are grouped into two groups side by side and turn on in sequence. FIG. 2B shows some other semiconductor diodes of the light source 11 grouped into two groups that are interleaved and turn on in sequence. It is noted that shape and size of the semiconductor diodes of the light source 11 may even be different. FIG. 2C shows semiconductor diodes of the light source 11 that are grouped into two interleaved groups by shape and turn on in sequence.

The structured-light projector 100 of the embodiment may include a beam limiting device 12 that receives the emitted light (from the light source 11) and causes the spatial cross section of the emitted light to become smaller, resulting in a collimated light. In a preferred embodiment, the beam limiting device 12 may include a collimating lens, which may be composed of a transparent material such as plastic or glass, and may be preferably fabricated by wafer-level optics (WLO) technique. As exemplified in, but not limited to, FIG. 1B, the collimating lens (i.e., the beam limiting device 12) has a planar surface at a (left-hand) side facing the light source 11, and a convex surface at the other side (e.g., right-hand side). Although the beam limiting device 12 of the embodiment as exemplified in FIG. 1B includes a single lens, it is appreciated that a person skilled in the pertinent art may construct an equivalent beam limiting device with multiple lenses or multiple groups of lens.

The structured-light projector 100 of the embodiment may include a diffractive optical element (DOE) 13 that receives the collimated light (from the beam limiting device 12) and generates multiple light tiles. The light tiles are generally spaced in a two-dimensional manner. As exemplified in FIG. 1B, the DOE 13 of the embodiment may include multiple optical components (e.g., refractive optical components) 131 disposed on a substrate 132. The optical components 131 may be disposed, for example, on a (right-hand) side opposite the (left-hand) side facing the beam limiting device 12. The DOE 13 may be composed of a transparent material such as plastic or glass.

According to one aspect of the embodiment, the generated light tiles are randomly arranged. In the specification, the term "random" in the specification means that the light tiles are aperiodic or uncorrelated along at least one direction (e.g., horizontal direction). In other words, the light tiles along a specific direction (e.g., horizontal direction or X axis) do not follow or repeat any pattern. Accordingly, the light tiles generated by the DOE 13 may preferably be partially overlapped between adjacent light tiles.

Figure 3A:
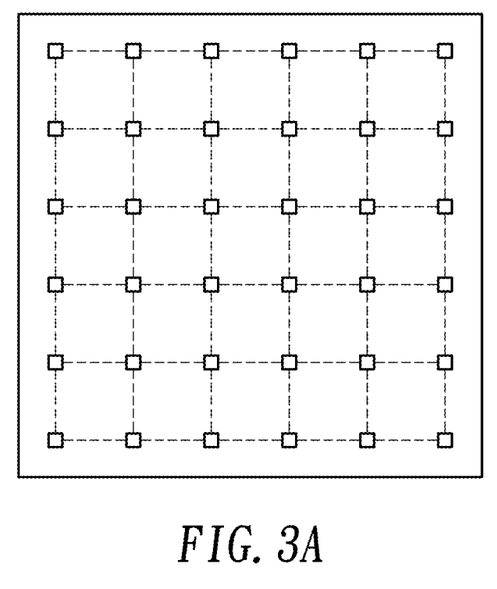
FIG. 3A and FIG. 3B exemplify centers of light tiles being periodically arranged.
Figure 3B:
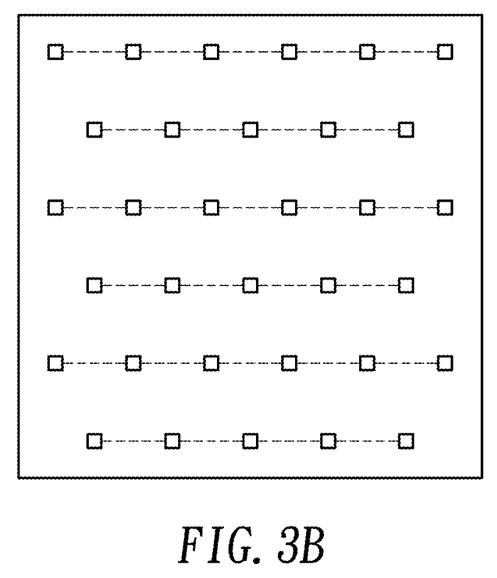
Figure 3C:
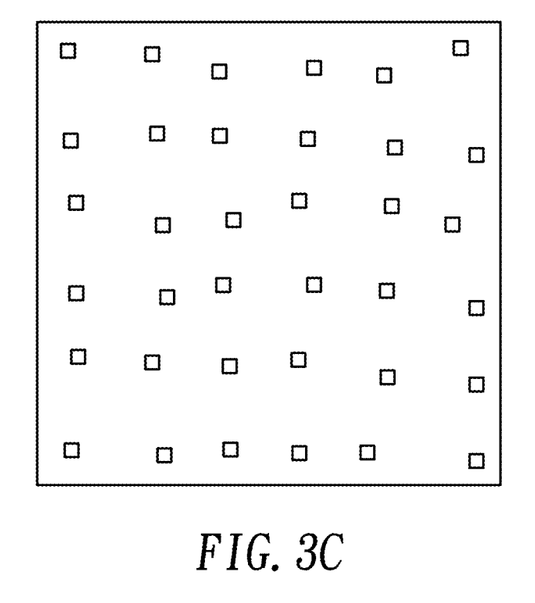
FIG. 3C and FIG. 3D exemplify centers of light tiles generated by the DOE of FIG. 1B being randomly or aperiodically arranged according to the embodiment of the present invention.
Figure 3D:
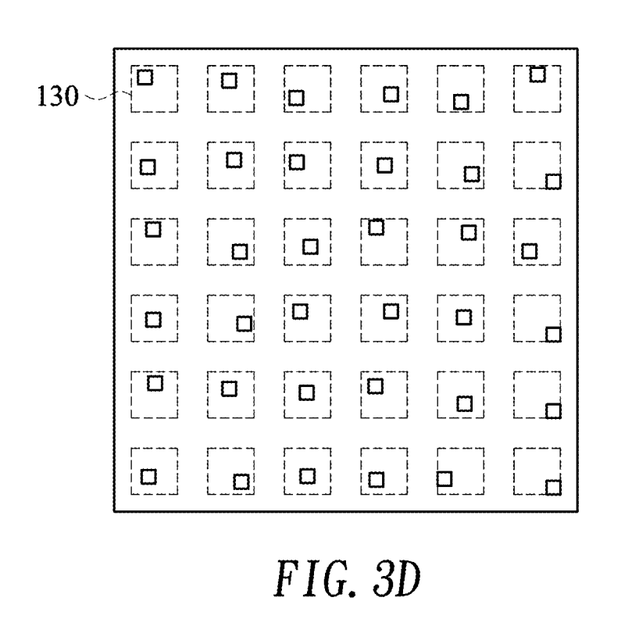

FIG. 3A exemplifies centers of light tiles being periodically arranged that evenly-spaced rows of light tiles are all vertically aligned. FIG. 3B exemplifies another centers of light tiles being periodically arranged that two types of evenly-spaced rows of light tiles are vertically interlaced and are horizontally shifted from each other. FIG. 3C exemplifies centers of light tiles generated by the DOE 13 of FIG. 1B being randomly or aperiodically arranged according to the embodiment of the present invention. Generally speaking, the light tiles are randomly shifted slightly in at least one dimension from a periodic arrangement. In one embodiment, shifting range of the light tiles as discussed above should be less than a predetermined range such that the point density of the projected image on a far-field object may be kept to be higher than a predetermined threshold value. FIG. 3D shows centers of light tiles, each of which is randomly shifted within an associated boundary 130 that is centered at a corresponding non-shifted position of the periodic arrangement. It is noted that the boundaries 130 are not overlapped. Alternatively speaking, gap with at least a predetermined value exists between adjacent boundaries 130.

It is observed that the performance (particularly the decode rate) of a projector with a periodic arrangement of the light tiles is poor primarily due to highly repetitive pattern, which increases difficulty of pattern matching. On the contrary, in the embodiment, the structured-light projector 100 with randomly arranged light tiles overcomes the drawbacks of the projector with periodically arranged light tiles, therefore significantly improving the decode rate and performance.

Moreover, according to theory in optics, if a focal length f of the collimating lens (i.e., the beam limiting device 12) as shown in FIG. 1B decreases, magnification of the predetermined pattern of the light source 11 projected onto a far-field object may therefore increase. It is noted that this increased magnification may not influence the performance of decode rate in the embodiment. Accordingly, overall volume of the structured-pattern projector 100 may thus be reduced, making minimizing the projector feasible. Further, as the light tiles are randomly arranged, the amount of the VCSEL diodes of the light source 11 may be reduced without affecting point density of the projected image on a far-field object. Accordingly, overall cost of the structured-pattern projector 100 may thus be reduced, making the projector cheaper.

Figure 3E:
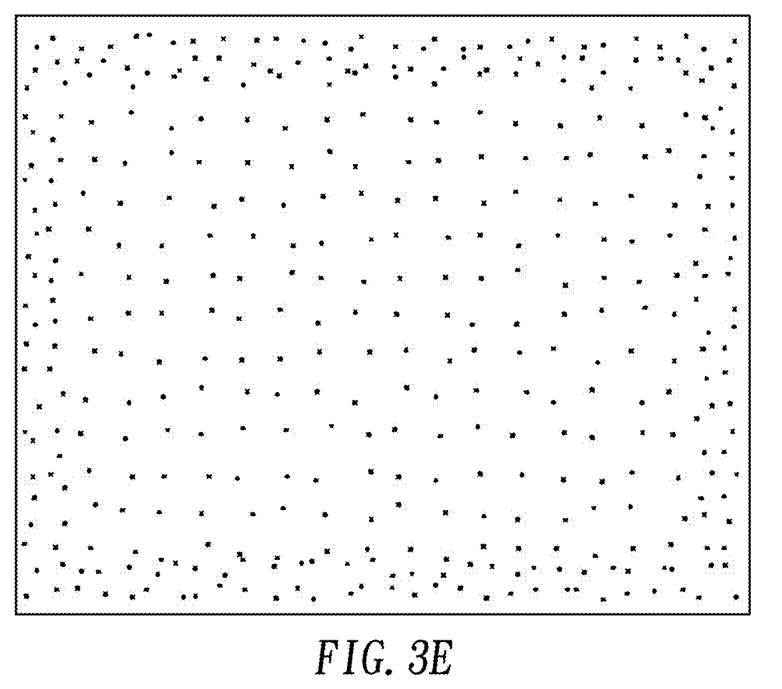
FIG. 3E shows an exemplary schematic diagram illustrating more light tiles being disposed on the edge of the light tiles.

In one embodiment of the invention, a density on an edge of the light tiles is higher than other portions of the light tiles. Accordingly, the point density on an edge of a projected image on a far-field object, particularly a flat object, may be comparable with other portions of the projected image without being affected by non-paraxial distortion, thereby enhancing 3D mapping. FIG. 3E shows an exemplary schematic diagram illustrating more light tiles being disposed on the edge of the light tiles.

Figure 3F:
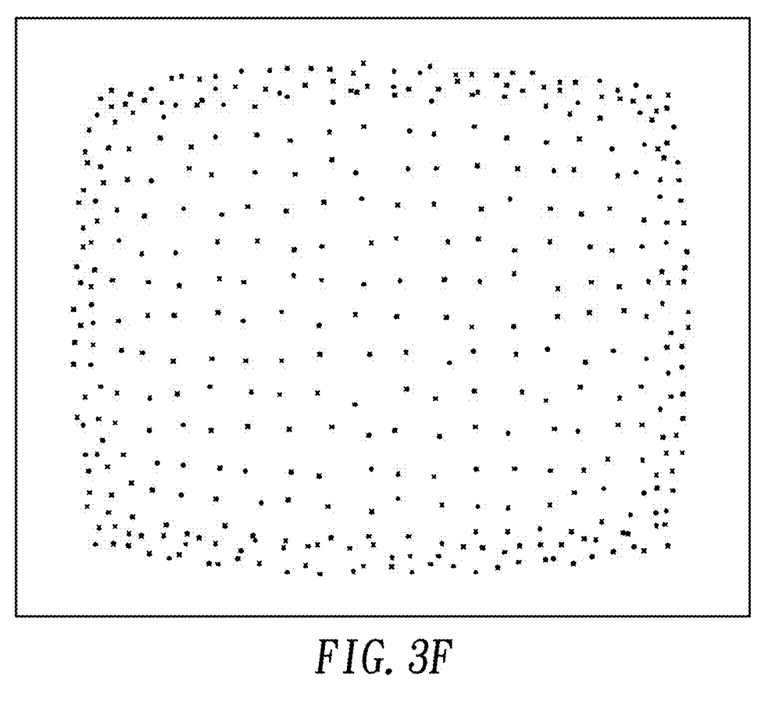
FIG. 3F shows an exemplary schematic diagram illustrating light tiles being subjected to a correction.

In another embodiment of the invention, the arrangement of light tiles is subjected to a correction that is inverse to optical distortion near an edge of the projected image on a far-field object, thereby compensating the distortion. FIG. 3F shows an exemplary schematic diagram illustrating light tiles being subjected to a correction.

Figure 4:
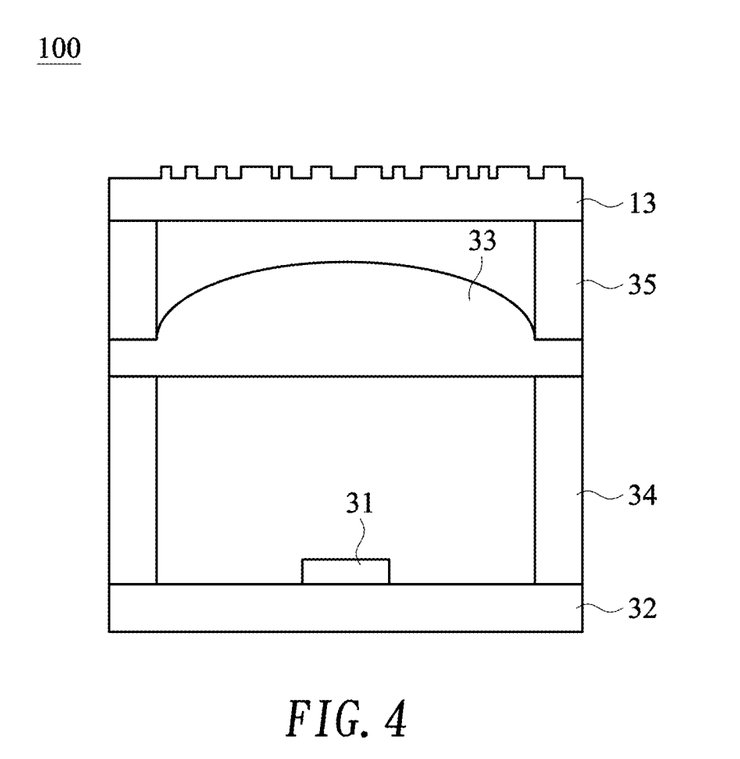
FIG. 4 shows a cross-sectional view exemplifying a structured-pattern projector according to one embodiment of the present invention.

FIG. 4 shows a cross-sectional view exemplifying a structured-pattern projector 100 according to one embodiment of the present invention. In the embodiment, the structured-pattern projector 100 may include a die 31 (acting as a light source 11) containing VCSEL diodes. The die 31 is mounted on a base 32. The structured-pattern projector 100 may include a collimating lens 33 (acting as a beam limiting device 12), which is separated from the die 31 and the base 32 by first spacers 34. The structured-pattern projector 100 may include a DOE 13, which is separated from the collimating lens 33 by second spacers 35. Therefore, the collimating lens 33 is disposed between the die 31 and the DOE 13.

Figure 5A:
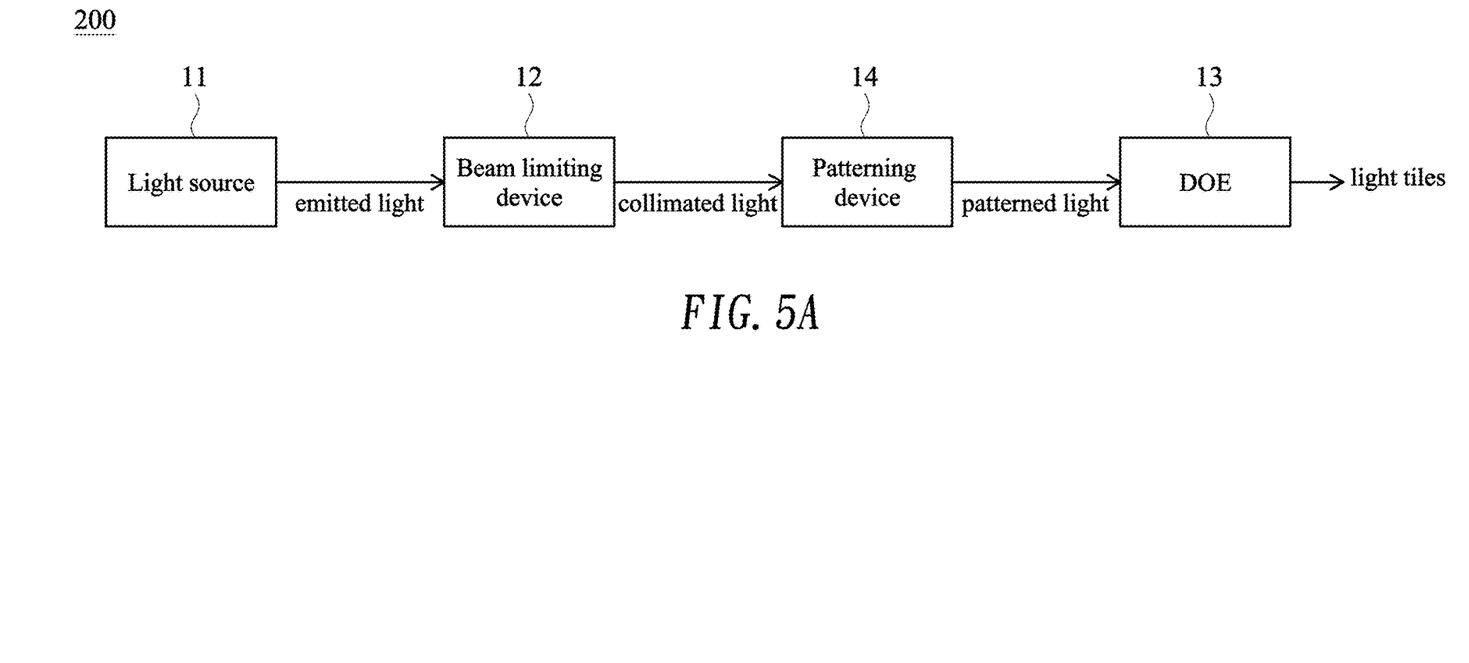
FIG. 5A shows a block diagram illustrated of a structured-light projector according to a second embodiment of the present invention.
Figure 5B:
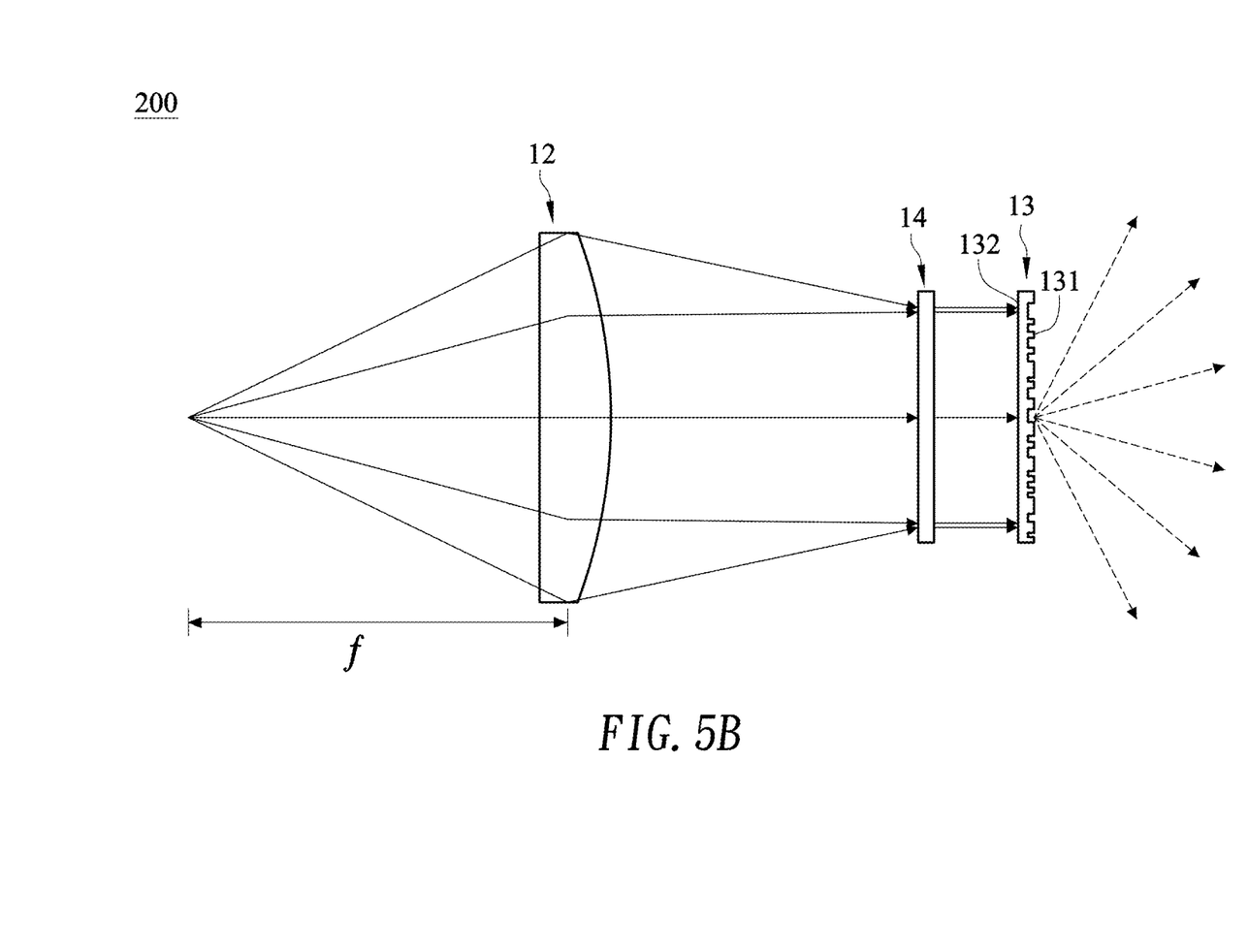
FIG. 5B shows a schematic diagram exemplifying the structured-light projector of FIG. 5A.

FIG. 5A shows a block diagram illustrated of a structured-light projector 200 according to a second embodiment of the present invention, and FIG. 5B shows a schematic diagram exemplifying the structured-light projector 200 of FIG. 5A. Technical details that are similar to the preceding embodiment are omitted for brevity.

In the embodiment, the structured-light projector 200 may include a light source 11, particularly a point light source, that emits an emitted light. The light source 11 of the embodiment may include a single semiconductor diode. In a preferred embodiment, the light source 11 may include an edge-emitting laser diode.

The structured-light projector 200 of the embodiment may include a beam limiting device 12 that receives the emitted light (from the light source 11) and causes the spatial cross section of the emitted light to become smaller, resulting in a collimated light. In a preferred embodiment, the beam limiting device 12 may include a collimating lens, which may be composed of a transparent material such as plastic or glass, and may be preferably fabricated by wafer-level optics (WLO) technique.

The structured-light projector 200 of the embodiment may include a patterning device 14 that receives the collimated light (from the beam limiting device 12) and generates a patterned light. In one embodiment, the patterning device 14 may include a tile diffractive optical element (DOE) or other suitable optical element or elements for generating the patterned light with a predetermined pattern.

The structured-light projector 200 of the embodiment may include a diffractive optical element (DOE) 13 that receives the patterned light (from the patterning device 14) and generates multiple light tiles. The light tiles are generally spaced in a two-dimensional manner. As exemplified in FIG. 5B, the DOE 13 of the embodiment may include multiple optical components (e.g., refractive optical components) 131 disposed on a substrate 132. Similar to the preceding embodiment, the light tiles are randomly arranged.

Figure 6:
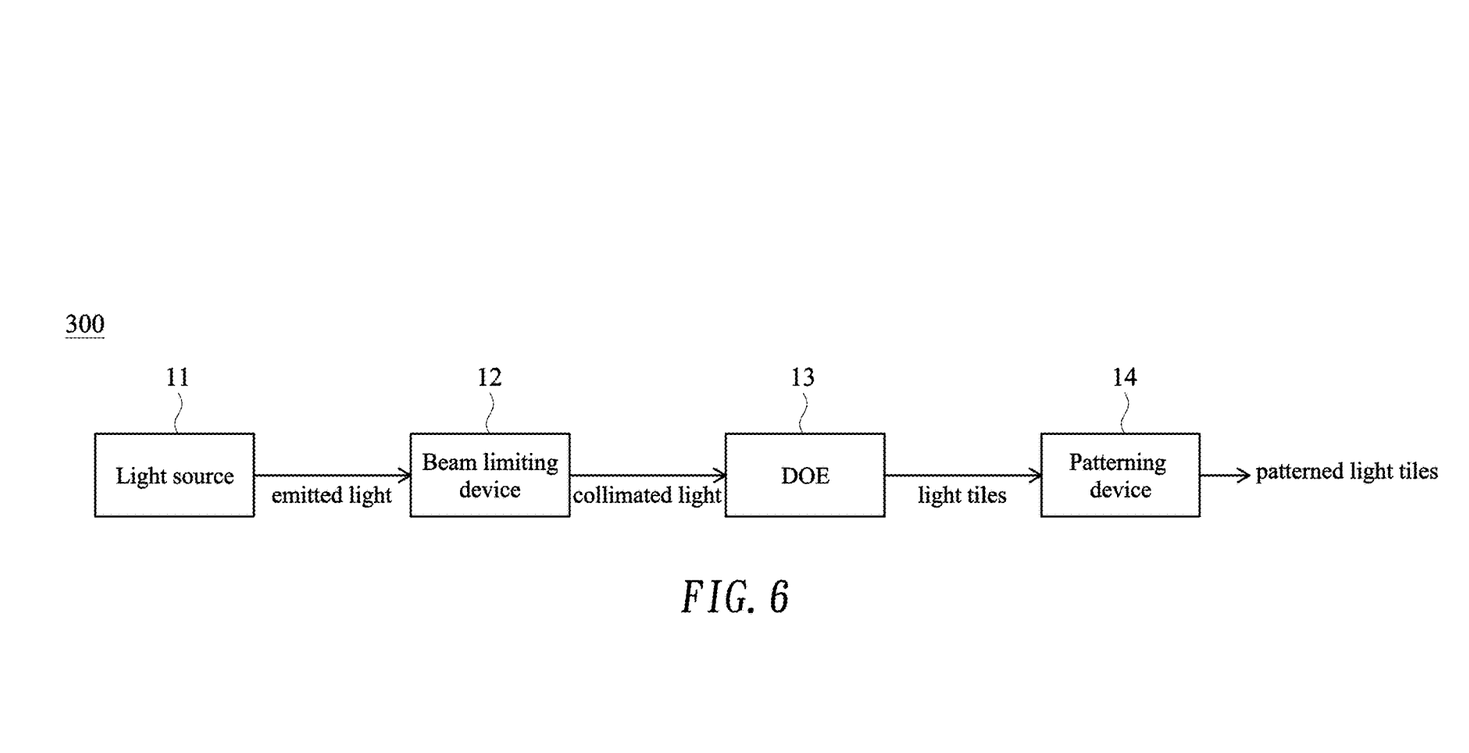
FIG. 6 shows a block diagram illustrated of a structured-light projector according to a modified second embodiment of the present invention.

FIG. 6 shows a block diagram illustrated of a structured-light projector 300 according to a modified second embodiment of the present invention. The present embodiment is similar to the embodiment shown in FIG. 5A, with the exception that the DOE 13 precedes the patterning device 14 in the present embodiment. Accordingly, the DOE 13 receives the collimated light (from the beam limiting device 12) and generates multiple light tiles (without patterns). Subsequently, the patterning device 14 receives the light tiles (from the DOE 13) and generates patterned light tiles.

Figure 7A:
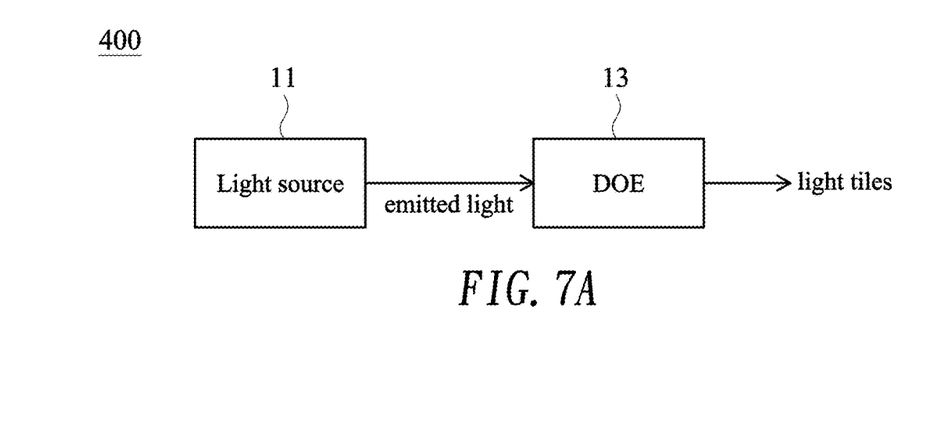
FIG. 7A shows a block diagram illustrating a structured-light projector according to a third embodiment of the present invention.
Figure 7B:
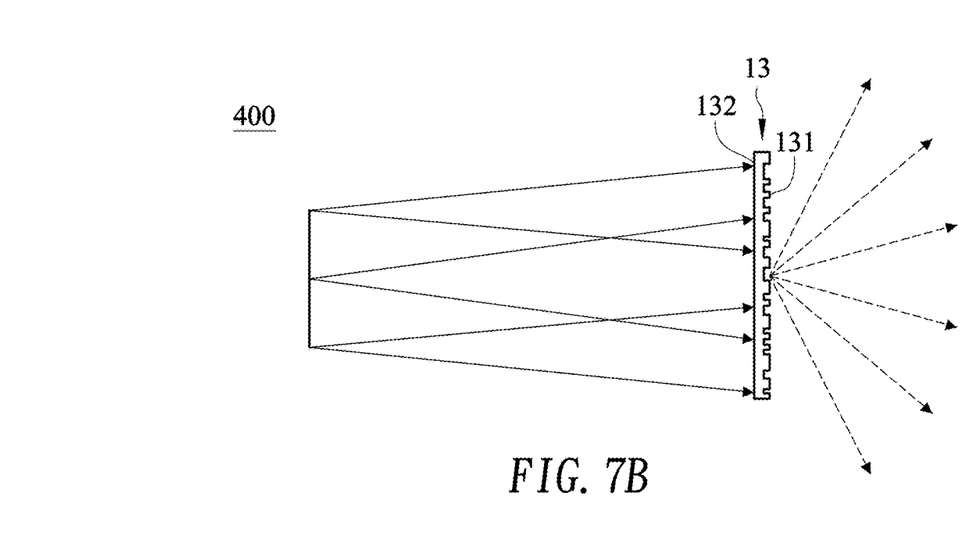
FIG. 7B shows a schematic diagram exemplifying the structured-light projector of FIG. 7A.

FIG. 7A shows a block diagram illustrating a structured-light projector 400 according to a third embodiment of the present invention, and FIG. 7B shows a schematic diagram exemplifying the structured-light projector 400 of FIG. 7A.

In the embodiment, the structured-light projector 400 may include a light source 11 that emits an emitted light with a predetermined pattern. The emitted light may be visible light and/or invisible light such as infrared light. The light source 11 of the embodiment may include an array of semiconductor diodes arranged according to the predetermined pattern. In a preferred embodiment, the light source 11 may include an array of vertical-cavity surface-emitting laser (VCSEL) diodes, which are disposed on a substrate (not shown) and are arranged on the substrate according to the predetermined pattern. Accordingly, the VCSEL diodes, as the light source 11, perform light emission and patterning at the same time.

The structured-light projector 400 of the embodiment may include a diffractive optical element (DOE) 13 that receives the emitted light (from the light source 11) and generates multiple light tiles. The light tiles are generally spaced in a two-dimensional manner. As exemplified in FIG. 7B, the DOE 13 of the embodiment may include multiple optical components (e.g., refractive optical components) 131 disposed on a substrate 132. The optical components 131 may be disposed, for example, on a (right-hand) side opposite the (left-hand) side facing the light source 11. The DOE 13 may be composed of a transparent material such as plastic or glass. Compared to the embodiment shown in FIG. 1A, as no beam limiting device 12 is disposed between the light source 11 and the DOE 13, the structured-light projector 400 of the embodiment can be made more compact than the structured-light projector 100 of FIG. 1A.

Figure 8A:
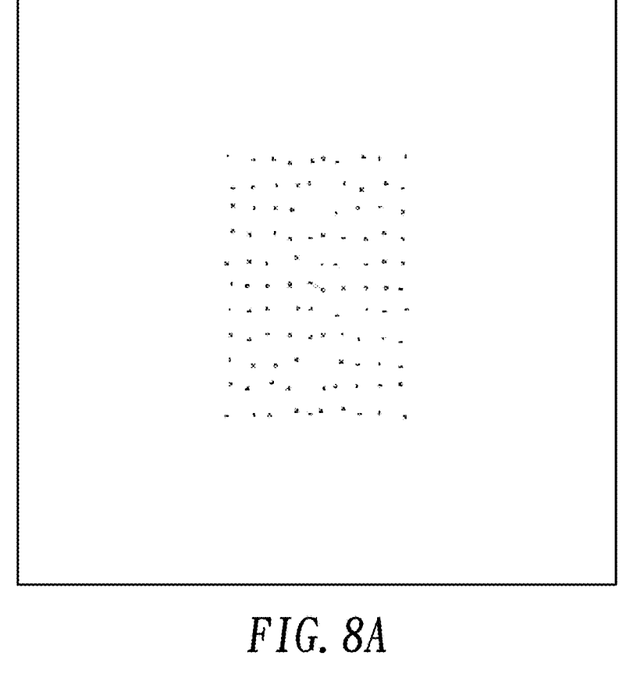
FIG. 8A exemplifies centers of light tiles generated by the DOE of FIG. 7A being randomly arranged according to the embodiment of the present invention.
Figure 8B:
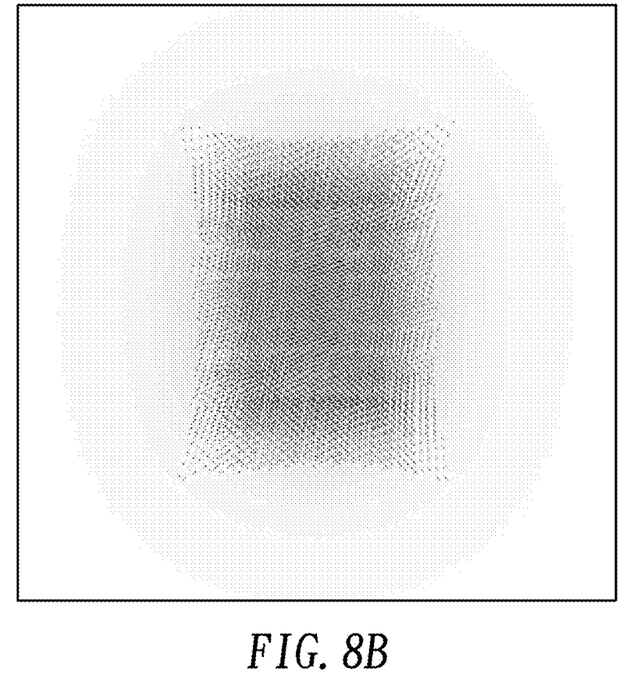
FIG. 8B shows the partially overlapped light tiles of FIG. 8A with random arrangement.

FIG. 8A exemplifies centers of light tiles generated by the DOE 13 of FIG. 7A being randomly (or aperiodically) arranged according to the embodiment of the present invention. FIG. 8B shows the partially overlapped light tiles of FIG. 8A with random arrangement.

Figure 9A:
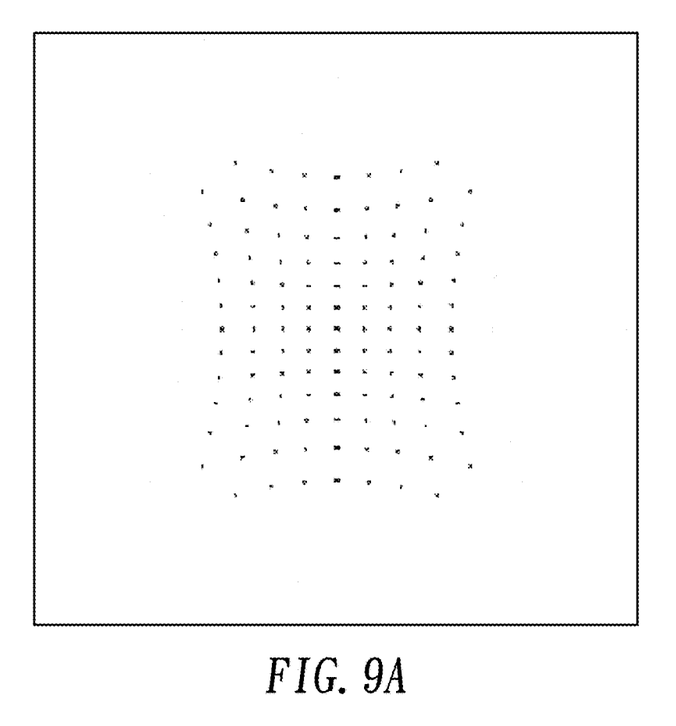
FIG. 9A further exemplifies centers of light tiles generated by the DOE of FIG. 7A being regularly arranged according to the embodiment of the present invention.
Figure 9B:
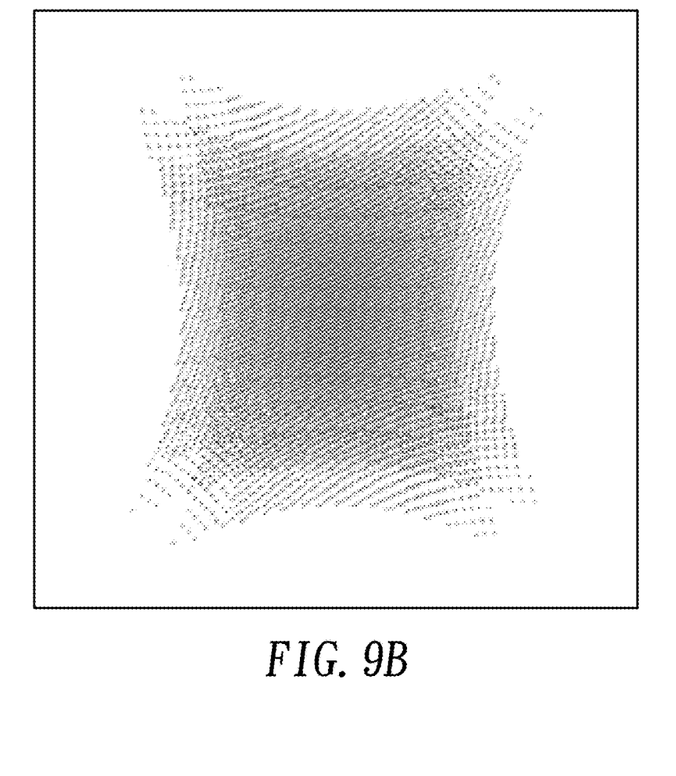
FIG. 9B shows the partially overlapped light tiles of FIG. 9A with regular arrangement.

FIG. 9A further exemplifies centers of light tiles generated by the DOE 13 of FIG. 7A being regularly (or periodically) arranged according to the embodiment of the present invention. FIG. 9B shows the partially overlapped light tiles of FIG. 9A with regular (fan-out) arrangement. It is observed that the overlapped light tiles in FIG. 9B have spots density more uniform than those in FIG. 8B, and thus have higher contrast ratio. However, the overlapped light tiles in FIG. 8B have higher efficiency as more light spots may stay in a region-of-interest region.

Although specific embodiments have been illustrated and described, it will be appreciated by those skilled in the art that various modifications may be made without departing from the scope of the present invention, which is intended to be limited solely by the appended claims.

What is claimed is:

1. A structured-light projector, comprising:
   a diffractive optical element (DOE) that receives a collimated light and generates a plurality of light tiles, the DOE including a plurality of optical components disposed on a substrate;
   wherein the light tiles are randomly arranged; and
   wherein arrangement of the light tiles is subjected to a correction that is inverse to optical distortion near an edge of a projected image on a far-field object, thereby compensating the distortion.

2. The structured-light projector of claim 1, wherein the light tiles are aperiodic or uncorrelated along at least one direction.

3. The structured-light projector of claim 1, wherein the light tiles generated by the DOE are partially overlapped between adjacent light tiles.

4. A structured-light projector, comprising:
   a light source that emits an emitted light with a predetermined pattern;
   a beam limiting device that receives the emitted light and generates a collimated light; and
   a diffractive optical element (DOE) that receives the collimated light and generates a plurality of light tiles, which are randomly disposed;
   wherein arrangement of the light tiles is subjected to a correction that is inverse to optical distortion near an edge of a projected image on a far-field object, thereby compensating the distortion.

5. The structured-light projector of claim 4, wherein the light source comprises an array of semiconductor diodes arranged according to the predetermined pattern.

6. The structured-light projector of claim 5, wherein the semiconductor diodes are grouped into a plurality of groups that turn on in sequence.

7. The structured-light projector of claim 6, wherein the semiconductor diodes of different groups have different shape or size.

8. The structured-light projector of claim 4, wherein the light tiles generated by the DOE are partially overlapped between adjacent light tiles.

9. A structured-light projector, comprising:
a point light source that emits an emitted light;
a beam limiting device that receives the emitted light and generates a collimated light;
a patterning device that receives the collimated light and generates a patterned light; and
a diffractive optical element (DOE) that receives the patterned light and generates a plurality of light tiles, which are randomly disposed;
wherein arrangement of the light tiles is subjected to a correction that is inverse to optical distortion near an edge of a projected image on a far-field object, thereby compensating the distortion.

10. The structured-light projector of claim 9, wherein the light source comprises an edge-emitting laser diode.

11. The structured-light projector of claim 9, wherein the light tiles generated by the DOE are partially overlapped between adjacent light tiles.

12. A structured-light projector, comprising:
a point light source that emits an emitted light;
a beam limiting device that receives the emitted light and generates a collimated light;
a diffractive optical element (DOE) that receives the collimated light and generates a plurality of light tiles, which are randomly disposed; and
a patterning device that receives the light tiles and generates patterned light tiles;
wherein arrangement of the light tiles is subjected to a correction that is inverse to optical distortion near an edge of a projected image on a far-field object, thereby compensating the distortion.

13. The structured-light projector of claim 12, wherein the patterned light tiles are partially overlapped between adjacent patterned light tiles.

14. A structured-light projector, comprising:
a light source that emits an emitted light with a predetermined pattern; and
a diffractive optical element (DOE) that directly receives the emitted light and generates a plurality of light tiles, which are randomly disposed;
wherein arrangement of the light tiles is subjected to a correction that is inverse to optical distortion near an edge of a projected image on a far-field object, thereby compensating the distortion.

15. The structured-light projector of claim 14, wherein the light source comprises an array of semiconductor diodes arranged according to the predetermined pattern.

16. The structured-light projector of claim 14, wherein the light tiles generated by the DOE are partially overlapped between adjacent light tiles.

17. A structured-light projector, comprising:
a light source that emits an emitted light with a predetermined pattern; and
a diffractive optical element (DOE) that directly receives the emitted light and generates a plurality of light tiles, which are regularly disposed;
wherein arrangement of the light tiles is subjected to a correction that is inverse to optical distortion near an edge of a projected image on a far-field object, thereby compensating the distortion.

18. The structured-light projector of claim 17, wherein the light source comprises an array of semiconductor diodes arranged according to the predetermined pattern.

19. The structured-light projector of claim 18, wherein the semiconductor diode comprises a vertical-cavity surface-emitting laser (VCSEL) diode.

20. The structured-light projector of claim 17, wherein the light tiles generated by the DOE are partially overlapped between adjacent light tiles.

* * * * *